(12) United States Patent
Tomoda

(10) Patent No.: US 12,230,302 B2
(45) Date of Patent: Feb. 18, 2025

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventor: Yusuke Tomoda, Kawasaki Kanagawa (JP)

(73) Assignees: Kabusbiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/180,463

(22) Filed: Mar. 8, 2023

(65) Prior Publication Data
US 2024/0096358 A1 Mar. 21, 2024

(30) Foreign Application Priority Data
Sep. 20, 2022 (JP) .................... 2022-149153

(51) Int. Cl.
*G11B 20/18* (2006.01)
*G11B 5/55* (2006.01)

(52) U.S. Cl.
CPC .................... *G11B 5/556* (2013.01)

(58) Field of Classification Search
CPC ....... G11B 5/09; G11B 5/012; G11B 20/1217; G11B 2020/10; G11B 5/187; G11B 5/6088; G11B 2005/001; G11B 2005/0021; G11B 2020/10898; G11B 27/36; G11B 20/12; G11B 15/005; G11B 20/18
USPC ...................................... 360/75, 48
See application file for complete search history.

(56) References Cited

U.S. PATENT DOCUMENTS

| | | | |
|---|---|---|---|
| 6,535,953 B1 | 3/2003 | Kakiuchi | |
| 8,949,521 B1 | 2/2015 | Heath et al. | |
| 9,336,819 B2 * | 5/2016 | Cho | G11B 20/18 |
| 9,607,631 B2 * | 3/2017 | Rausch | G11B 20/1889 |
| 10,096,338 B2 * | 10/2018 | Hasegawa | G11B 5/012 |
| 10,522,185 B1 | 12/2019 | Hall | |
| 11,017,804 B1 * | 5/2021 | Tomoda | G11B 5/012 |

* cited by examiner

*Primary Examiner* — Nabil Z Hindi
(74) *Attorney, Agent, or Firm* — Kim & Stewart LLP

(57) ABSTRACT

According to an embodiment, a magnetic disk device includes a magnetic disk, a magnetic head, and a control circuit. The magnetic disk has a plurality of first storage regions disposed in the radial direction. The recording method is changeable for each of the plurality of first storage regions. The control circuit operates such that, when having received a first command instructing to change the recording method of one first storage region out of a plurality of first storage regions, the control circuit changes the recording method of the one first storage region in accordance with the first command, and moves a magnetic head onto the second storage region before receiving a second command.

10 Claims, 5 Drawing Sheets

MAGNETIC DISK DEVICE AND METHOD

CROSS-REFERENCE TO RELATED APPLICATIONS

This application is based upon and claims the benefit of priority from Japanese Patent Application No. 2022-149153, filed on Sep. 20, 2022; the entire contents of which are incorporated herein by reference.

FIELD

Embodiments described herein relate generally to a magnetic disk device and a method.

BACKGROUND

In recent years, there has been developed a magnetic disk device capable of changing a recording method of a magnetic disk among a plurality of methods. Examples of the plurality of methods can include a method referred to as Shingled Magnetic Recording (SMR) or a method referred to as Conventional Magnetic Recording (CMR).

DETAILED DESCRIPTION

According to the present embodiment, the magnetic disk device includes a magnetic disk, a magnetic head, and a control circuit. The magnetic disk has a plurality of first storage regions disposed in the radial direction. The recording method is changeable for each of the plurality of first storage regions. The control circuit operates such that, when having received a first command instructing to change the recording method of one storage region of the plurality of first storage regions, the control circuit changes the recording method of a second storage region in accordance with the first command, the second storage region being the one first storage region, and moves a magnetic head onto the second storage region before receiving a second command.

Hereinafter, the magnetic disk device and a method according to an embodiment will be described in detail with reference to the attached drawings. The present invention is not limited to the following embodiments.

EMBODIMENTS

Figure 1:
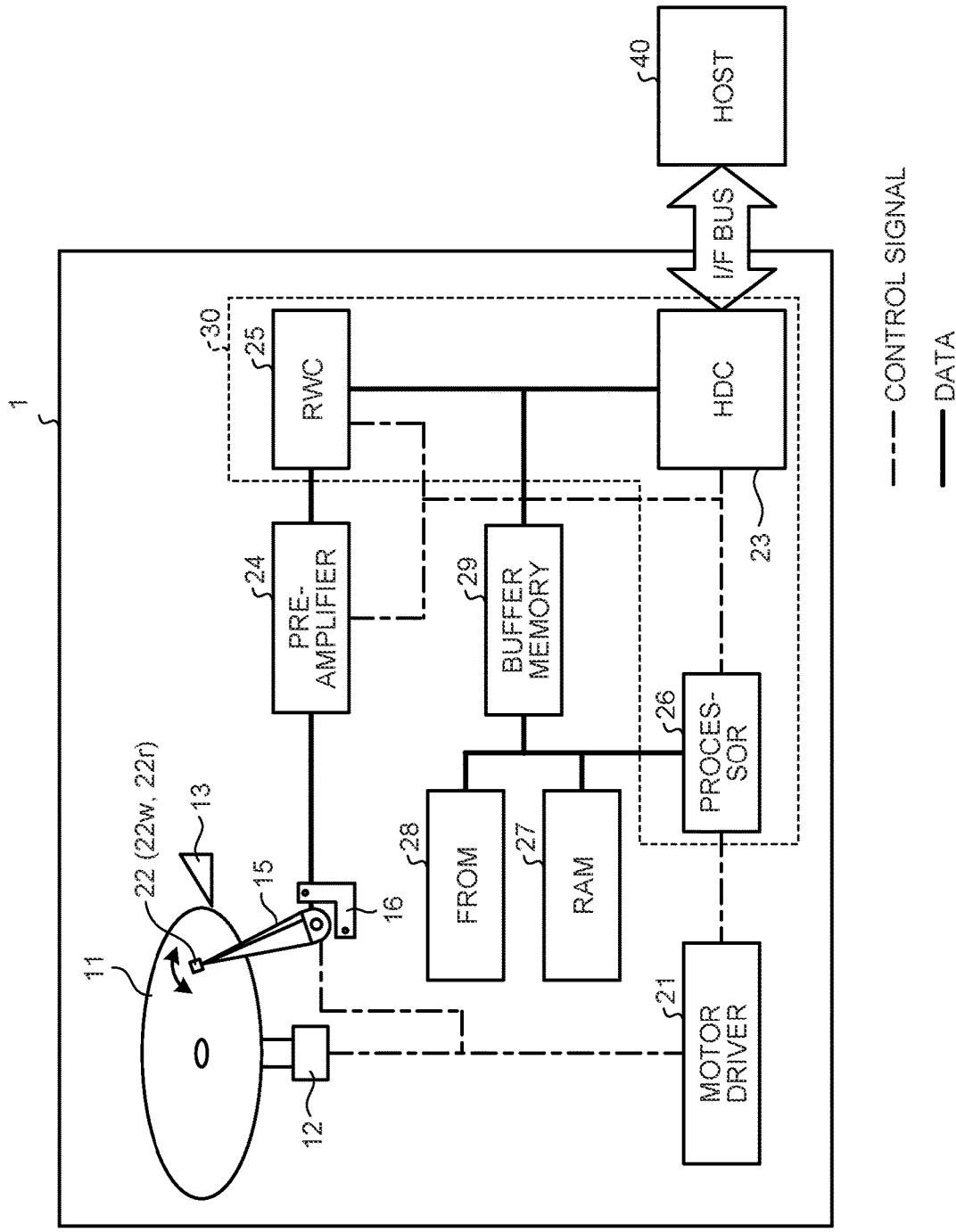
FIG. 1 is a diagram illustrating an example of a configuration of a magnetic disk device according to an embodiment.

FIG. 1 is a diagram illustrating an example of a configuration of a magnetic disk device 1 according to the embodiment.

The magnetic disk device 1 is connected to a host 40. The magnetic disk device 1 can receive an access command such as a write command or a read command from the host 40. The magnetic disk device 1 can receive a command instructing to change the recording method, in addition to the access command. The recording method and the change of the recording method will be described below.

The magnetic disk device 1 includes a magnetic disk 11. The magnetic disk device 1 writes data to the magnetic disk 11 or reads data from the magnetic disk 11 in response to the access command.

Data is written and read via a magnetic head 22. Specifically, as devices in addition to the magnetic disk 11, the magnetic disk device 1 includes a spindle motor 12, a motor driver 21, a magnetic head 22, an actuator arm 15, a voice coil motor (VCM) 16, a ramp 13, a preamplifier 24, a read/write channel (RWC) 25, a hard disk controller (HDC) 23, buffer memory 29, and a processor 26.

The magnetic disk 11 is rotated by the spindle motor 12 at a predetermined rotation speed about a rotation axis. Rotation of the spindle motor 12 is driven by the motor driver 21.

The magnetic head 22 uses a write element $22w$ and a read element $22r$ provided therein to write and read data to and from the magnetic disk 11. The magnetic head 22 is attached to a distal end of the actuator arm 15. The magnetic head 22 is moved in the radial direction of the magnetic disk 11 by the VCM 16 driven by the motor driver 21. For example, during the time such as when the rotation of the magnetic disk 11 is stopped, the magnetic head 22 is moved onto the ramp 13.

The preamplifier 24 amplifies and outputs a signal read from the magnetic disk 11 by the magnetic head 22 at the time of reading data from the magnetic disk 11, and supplies the amplified signal to the RWC 25. In addition, the preamplifier 24 amplifies a signal corresponding to the data to be written supplied from the RWC 25 and supplies the amplified signal to the magnetic head 22.

The HDC 23 performs processes such as control of transmission and reception of data with the host 40 via the I/F bus, control of the buffer memory 29, and error correction processing on data that has been read.

The buffer memory 29 is used as a buffer for data transmitted to and received from the host 40. For example, the buffer memory 29 is used to store data to be written until the data is written to the magnetic disk 11.

The buffer memory 29 is formed with volatile memory capable of high-speed operation, for example. The type of the memory constituting the buffer memory 29 is not limited to a specific type. The buffer memory 29 can be formed with memory such as Dynamic Random Access Memory (DRAM) and Static Random Access Memory (SRAM), for example.

The RWC 25 applies code modulation on data to be written supplied from the HDC 23, and supplies the modulated data to the preamplifier 24. In addition, the RWC 25 performs code demodulation on a signal read from the magnetic disk 11 and supplied from the preamplifier 24, and outputs the demodulated signal to the HDC 23 as digital data.

An example of the processor 26 is a central processing unit (CPU). The processor 26 is connected to RAM 27, flash read only memory (FROM) 28, and the buffer memory 29.

The RAM 27 is formed with DRAM or SRAM. The RAM 27 is used as operation memory by the processor 26. The RAM 27 is used as a region in which firmware (program data) is loaded and a region in which various types of management data are temporarily stored.

The FROM 28 is nonvolatile memory. The processor 26 performs overall control of the magnetic disk device 1 according to firmware preliminarily stored in a nonvolatile region such as the FROM 28 and the magnetic disk 11. For example, the processor 26 loads the firmware from the FROM 28 or the magnetic disk 11 into the RAM 27, and executes control of the motor driver 21, the preamplifier 24, the RWC 25, the HDC 23, and the like according to the loaded firmware.

Incidentally, a configuration including the processor 26, the HDC 23, and the RWC 25 can also be regarded as the control circuit 30. The control circuit 30 may include other elements such as the RAM 27, the FROM 28, or the buffer memory 29. In addition, the control circuit 30 need not include the RWC 25.

Figure 2:
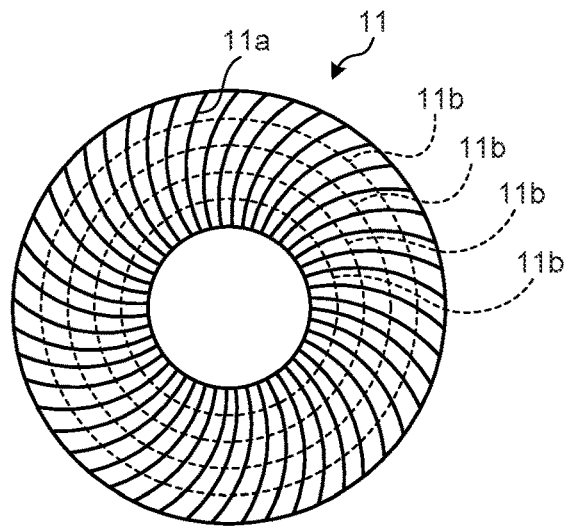
FIG. 2 is a diagram illustrating an example of a configuration of a magnetic disk according to the embodiment.

FIG. 2 is a diagram illustrating an example of a configuration of the magnetic disk 11 according to the embodiment. There is a magnetic layer formed on the surface of the magnetic disk 11, and servo information is written into the magnetic layer by a servo writer before shipment, for example. The servo information includes sector/cylinder information, a burst pattern, and a post code. The sector/cylinder information gives servo addresses in the circumferential direction and the radial direction of the magnetic disk 11. The burst pattern gives the amount of positional deviation of the magnetic head 22 from the position indicated by the servo address. The post code is data for correcting Repeatable RunOut (RRO). The control circuit 30 reads servo information using the magnetic head 22, and executes a seek operation and a tracking operation based on the servo information that has been read. The seek operation is an operation of moving the magnetic head 22 in the radial direction. The tracking operation is an operation of maintaining the magnetic head 22 on a target track. The servo information may be written in the magnetic disk 11 after shipment by self-servo write (SSW).

FIG. 2 illustrates servo zones 11a disposed radially as an example of arrangement of servo zones in which servo information is written. A plurality of concentric tracks 11b is provided at a predetermined pitch in the radial direction of the magnetic disk 11. A large number of sectors are continuously formed on the circumference of each of the tracks 11b. Data is written and read by the magnetic head 22 for each sector.

The recording method, that is, a method of writing data to the magnetic disk 11, includes a plurality of recording methods. The plurality of recording methods include the SMR method and the CMR method.

Figure 3:
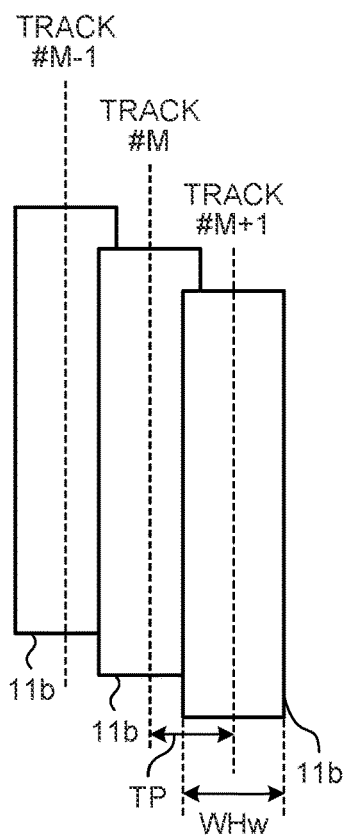
FIG. 3 is a schematic diagram illustrating an SMR method according to the embodiment.

FIG. 3 is a schematic diagram illustrating the SMR method according to the embodiment. The SMR is a method of writing data of each track used in a case of writing data in a certain track (referred to as first data) and thereafter writing data in a track adjacent to the track in the radial direction (referred to as second data) in which the writing is executed such that the second data overlaps a part of the first data. That is, according to SMR, in the presence of two tracks adjacent to each other in the radial direction of the magnetic disk 11, data of one track is written so as to overlap a part of data of another track of the two tracks.

As an example, FIG. 3 illustrates three tracks 11b, namely, track #M−1, track #M, and track M+1. Track #M−1 and track #M are adjacent to each other. Track #M and the track #M+1 are adjacent to each other. In this example, data of track #M−1, data of track #M, and data of track M+1 are written in this order. The data of track #M is written so as to partially overlap the data of track #M−1 in the radial direction. The data of track #M+1 is written so as to partially overlap the data of track #M in the radial direction. That is, according to SMR, data of one track 11b repeatedly overlaps a part of data of the adjacent track 11b to which data has already been written.

According to SMR, since data is written by the above-described method, a track pitch TP is made narrower than a core width (WHw) of the write element 22w of the magnetic head 22. This leads to improvement of recording density. That is, according to SMR, the storage capacity can be increased as compared with CMR described below.

However, according to SMR, the track pitch TP is narrower than the core width WHw of the write element 22w. Therefore, updating (in other words, rewriting) a part of data of a plurality of tracks would destroy the data of a track adjacent to the updated data. In order to prevent data destruction, according to SMR, data of a plurality of tracks including the part of data is collectively updated. A region including a plurality of tracks to be collectively updated is referred to as a band. Since the update method as described above is performed, SMR as lower random access performance compared with CMR described below.

Figure 4:
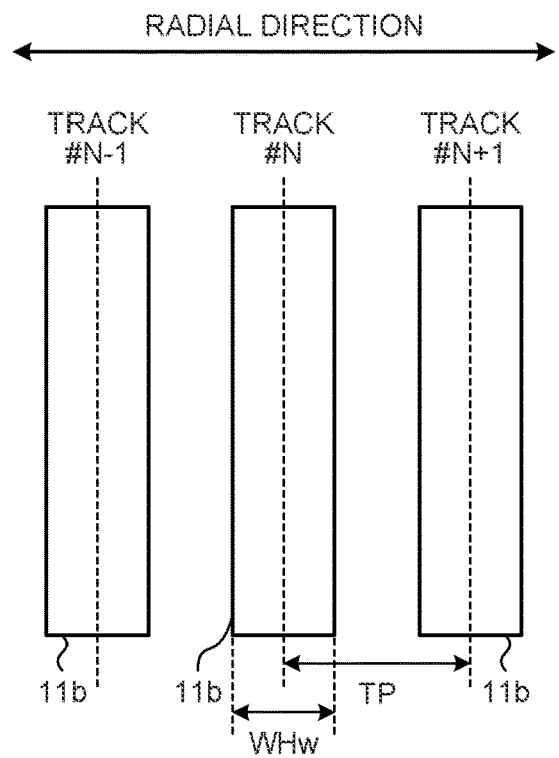
FIG. 4 is a schematic diagram illustrating a CMR method according to the embodiment.

FIG. 4 is a schematic diagram illustrating a CMR method according to the embodiment. As illustrated in the drawing, the data of each track in CMR is disposed so as not to overlap the data of the track adjacent in the radial direction. In other words, the CMR is a method in which data of two tracks adjacent to each other in the radial direction of the magnetic disk 11 is written so as not to overlap each other.

For example, FIG. 4 illustrates track #N−1, track #N, and track N+1, as the three tracks 1ib. The track #N−1 and the track #N are disposed apart from each other in the radial direction. The track #N and the track #N+1 are disposed apart from each other in the radial direction. That is, the track #N−1, the track #N, and the track N+1 are disposed such that data of two adjacent tracks do not overlap each other.

According to the CMR, the track pitch TP is the same as or larger than the core width (WHw) of the write element 22w, making it possible to update data at any position. Therefore, the CMR has a smaller storage capacity compared with the SMR, but on the other hand has higher random access performance.

The magnetic disk device 1 can write data by any of the SMR and the CMR methods. The recording method that can be executed by the magnetic disk device 1 is not limited to the SMR method or the CMR method. The magnetic disk device 1 may be configured to be able to write data by any recording method in addition to the SMR method and the CMR method. Alternatively, the magnetic disk device 1 may be configured to be able to write data by a plurality of any recording methods instead of one or both of the SMR method and the CMR method. Here, as an example, it is assumed that the magnetic disk device 1 is configured to be able to write data by the SMR method and the CMR method.

A change of the recording method is executed in units of predetermined storage regions. Here, as an example, it is assumed that the change of the recording method is executed in the unit of band.

Figure 5:
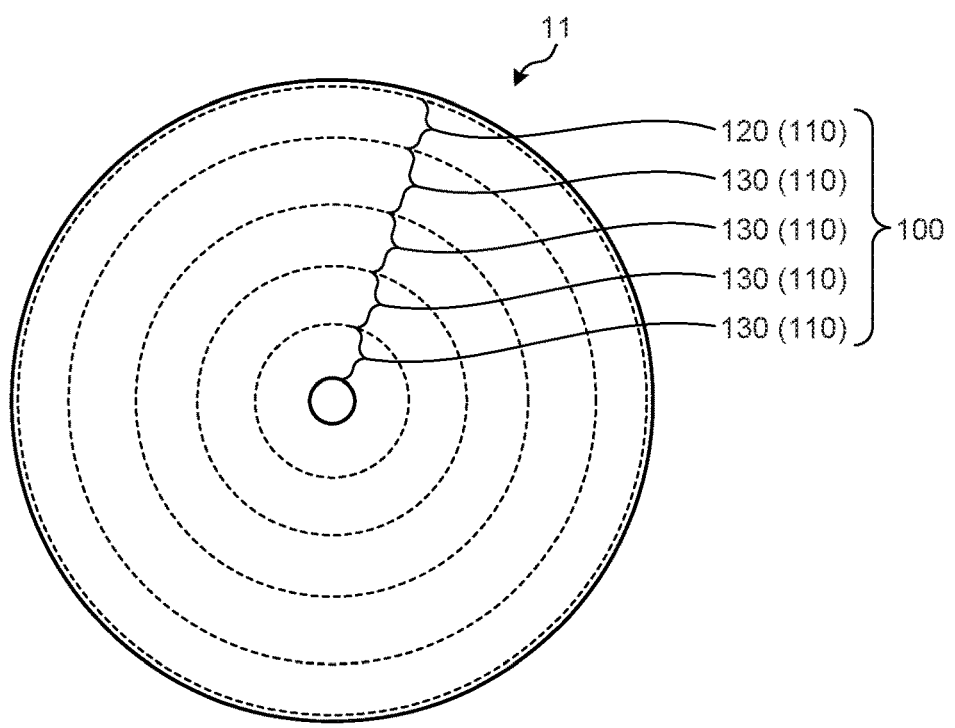
FIG. 5 is a schematic diagram illustrating an example of a plurality of bands provided in the magnetic disk according to the embodiment.

FIG. 5 is a schematic diagram illustrating an example of a plurality of bands provided in the magnetic disk 11 according to the embodiment.

A recording surface of the magnetic disk 11, that is, the region in which the track 11b can be disposed is divided into a plurality of storage regions 110 in the radial direction. The plurality of storage regions 110 includes one media cache region 120 and a plurality of bands 130. Although a region referred to as a guard region in which writing of data is prohibited is provided between the storage regions 110, FIG. 5 omits illustration of the guard region.

The storage region 110 provided on an outmost region in the radial direction in the recording surface is a media cache region 120 that is a storage region capable of temporarily storing data. The position of the media cache region 120 is not limited thereto. The number of media cache regions 120 provided on the recording surface is not limited to one. The media cache region 120 need not be provided on the recording surface.

In addition, on the recording surface, four bands 130 are provided as the plurality of bands 130. In other words, the four bands 130 are disposed in the radial direction. The number of bands 130 provided on the recording surface is not limited thereto.

The control circuit 30 changes the recording method for each band 130. Specifically, the process of changing the recording method is implemented by software setting change such as changing the arrangement of all the tracks 11b in the band 130 as a target of the recording method change. The control circuit 30 erases the setting of the arrangement of the track 11b before the change of the recording method, and sets the arrangement of the track 11b according to the new recording method after the change. For the band 130 that has undergone the recording method change, the control circuit 30 executes a seek operation and a tracking operation according to the new arrangement of the track 11b after the change.

In addition, the control circuit 30 changes the recording method in response to a command instructing a change of the recording method received from the host 40. The command instructing the change of the recording method is referred to as a change command. The change command can include designation of the recording method to be used after the change and designation of the band 130 as a target of the recording method change. The band 130 as a target of recording method change is referred to as a target band 130.

When the number of recording methods available for the magnetic disk device 1 is two, the change command does not necessarily need to explicitly include a new recording method after the change. The control circuit 30 may be configured to interpret the change command as a command for changing the recording method of the target band 130 from the currently set recording method to the other recording method of the two recording methods.

In addition, in a case where the recording method has been changed for the target band 130 in which data has already been written, the control circuit 30 is configured not to be able to read the written data after the recording method change. That is, in a case where the recording method is changed, the data written in the target band 130 before the change of the recording method is supposed to be erased.

As an example of utilization of the magnetic disk device 1 highly likely to be implemented, there would be a way of utilization in which the recording method of a certain band 130 storing unnecessary data is changed to start writing of new data to the band 130 in which all of the storage capacity becomes available by the recording method change. In the utilization of the embodiment, in order to start writing new data to the magnetic disk 11 as soon as possible, the control circuit 30, when changing the recording method of the target band 130 in response to the change command, moves the magnetic head 22 onto the target band 130 while changing the recording method. That is, when changing the recording method of the target band 130 in response to the change command, the control circuit 30 moves the magnetic head 22 onto the target band 130 before receiving another new command including a write command from the host 40 after the update command. With this configuration, in a case where the magnetic disk device 1 receives a write command for writing data to the target band 130 after the update command, it is possible to eliminate the necessity to move the magnetic head 22 in the radial direction according to the write command, or possible to suppress the distance of the movement. This makes it possible to quickly start writing data to the target band 130 using the magnetic head 22, leading to improvement of the writing performance.

Next, operations of the magnetic disk device 1 of the embodiment will be described. Here, a case where the recording method of one band 130 is changed from the SMR method to the CMR method and a case where the recording method of the target band 130 is changed from the CMR method to the SMR method will be separately described.

Figure 6:
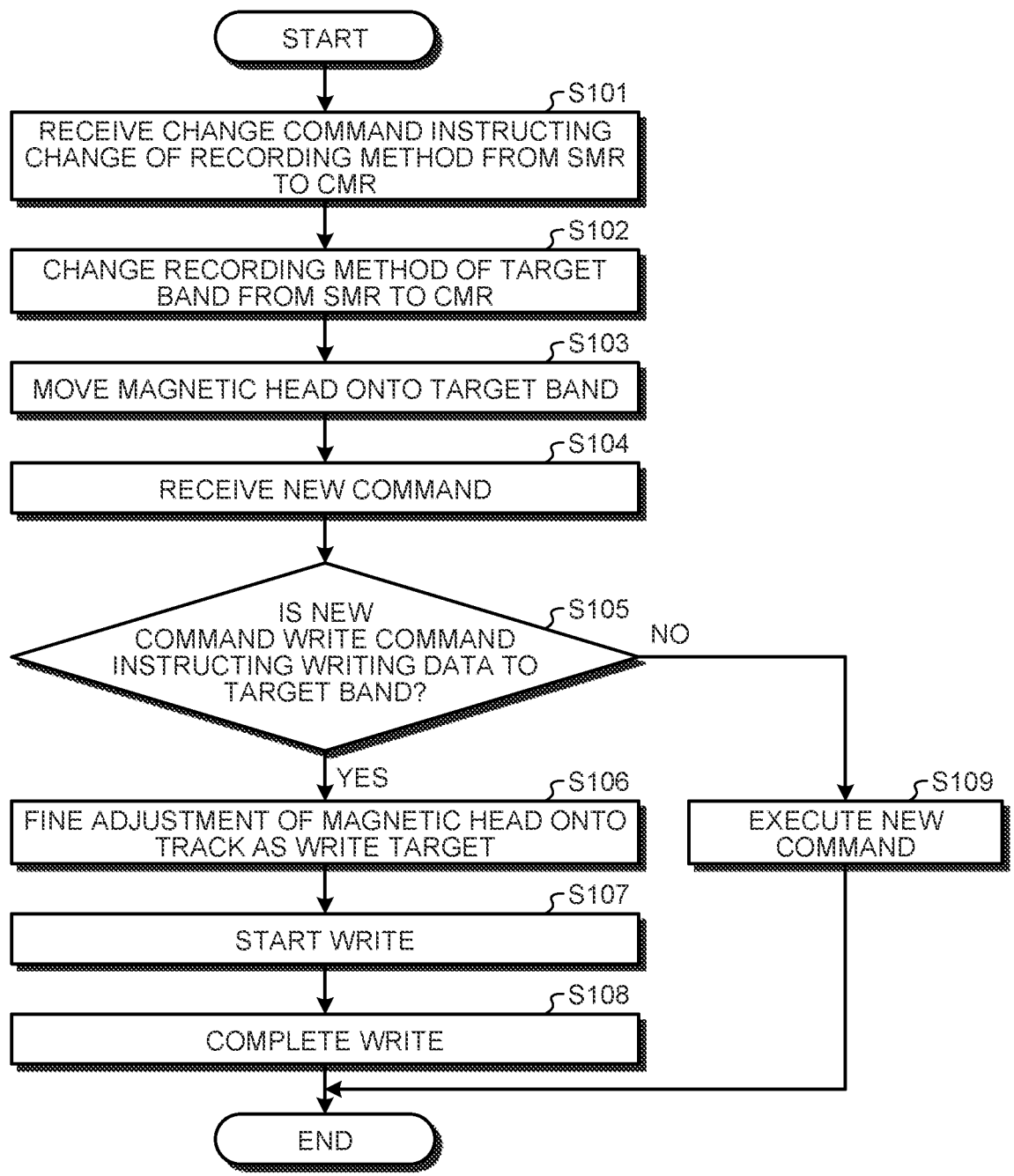
FIG. 6 is a flowchart illustrating an example of an operation of changing the recording method of one band from the SMR method to the CMR method in the magnetic disk device according to the embodiment.

FIG. 6 is a flowchart illustrating an example of an operation in changing the recording method of one band 130 from the SMR method to the CMR method in the magnetic disk device 1 according to the embodiment.

When having received a change command that designates one band 130 as the target band 130 and instructs to change the recording method of the target band 130 from the SMR method to the CMR method (S101), the control circuit 30 changes the recording method of the target band 130 from the SMR to the CMR according to the change command (S102).

The control circuit 30 controls the VCM 16 via the motor driver 21 to move the magnetic head 22 onto the target band 130 (S103).

The order of execution of the process of S102 and the process of S103 is not limited thereto. The control circuit 30 may execute the process of S102 and the process of S103 in parallel. Furthermore, the start timing of the process of S103 may be earlier than the start timing of the process of S102.

Subsequently, when having received a new command (that is, a command subsequent to the change command) from the host 40 (S104), the control circuit 30 determines whether the new command is a write command instructing to write data in the target band 130 (S105).

When the new command is a write command instructing to write data into the target band 130 (S105: Yes), the control circuit 30 controls the VCM 16 via the motor driver 21 to finely adjust the position of the magnetic head 22 onto the track 11b as a write target position (S106).

Note that the process of S106 can be skipped. For example, in a case where the position where the magnetic head 22 has moved by the process of S103 coincides with the track 11b as a write target position, the control circuit 30 skips the process of S106.

A microactuator such as a piezoelectric element may be provided at the distal end of the actuator arm 15, and the position of the magnetic head 22 may be finely adjusted by the microactuator. When the actuator arm 15 has such a configuration, in the process of S106, the motor driver 21 may finely adjust the position of the magnetic head 22 by the operation of only the microactuator without changing the motor position of the VCM 16.

When the position of the magnetic head 22 is on the track 11*b* as a write target position, the control circuit 30 starts writing data to the magnetic disk 11 using the magnetic head 22 (S107). With completion of the writing (S108), a series of operations ends.

When the new command is not a write command instructing to write data to the target band 130 (S105: No), the control circuit 30 executes the new command (S109) to end the series of operations.

Figure 7:
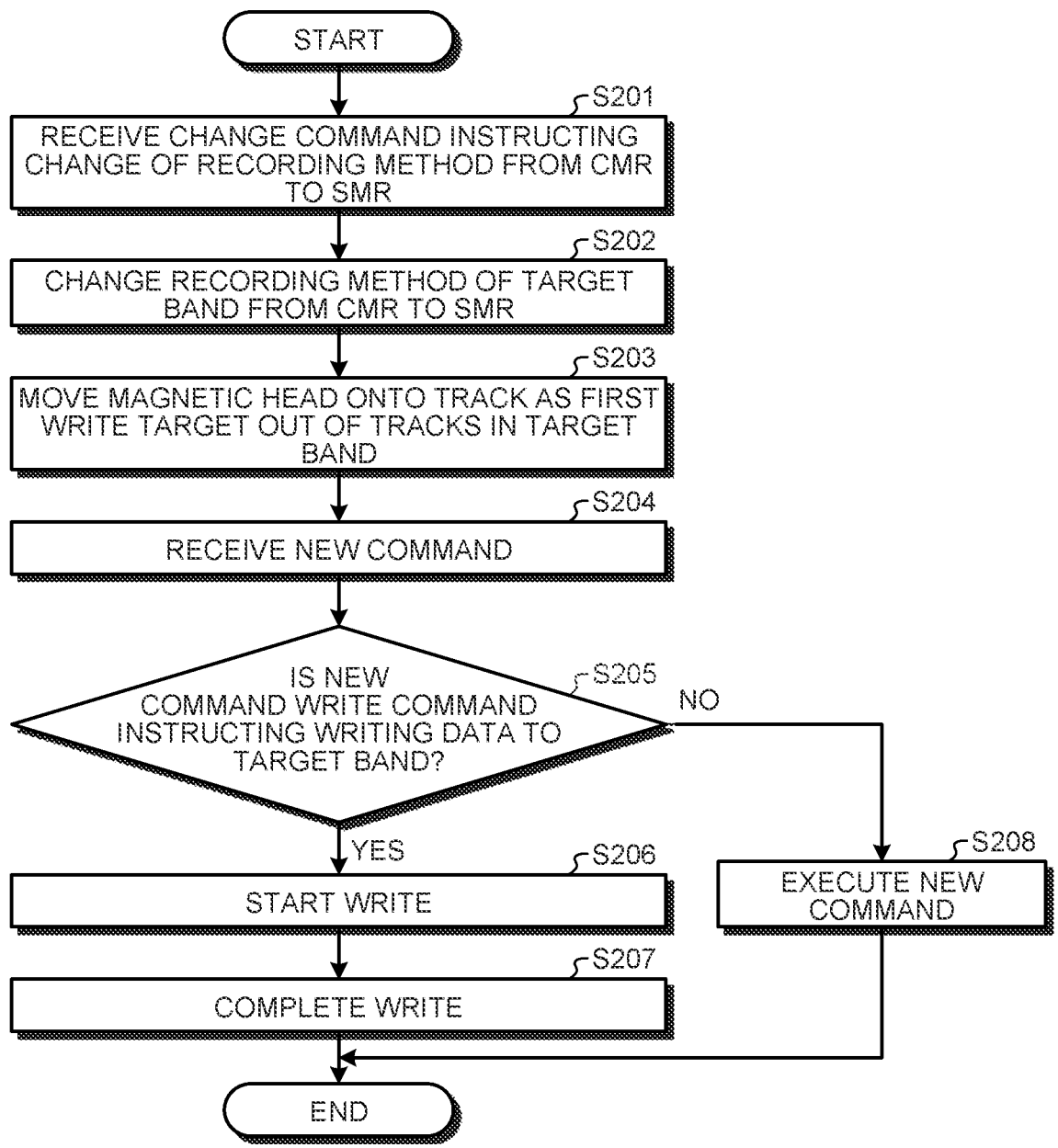
FIG. 7 is a flowchart illustrating an example of an operation of changing the recording method of one band from the CMR method to the SMR method in the magnetic disk device according to the embodiment.

FIG. 7 is a flowchart illustrating an example of an operation of changing the recording method of one band 130 from the CMR method to the SMR method in the magnetic disk device according to the embodiment.

When having received a change command that designates one band 130 as the target band 130 and instructs to change the recording method of the target band 130 from the CMR method to the SMR method (S201), the control circuit 30 changes the recording method of the target band 130 from the CMR to the SMR according to the change command (S202).

The control circuit 30 controls the VCM 16 via the motor driver 21 to move the magnetic head 22 onto the track 11*b* to be a first write target out of the tracks 11*b* in the target band 130 (S203).

As described above, according to the SMR method, the order of write is determined for the plurality of tracks 11*b* included in one band 130. Therefore, the track 11*b* as the first write target position in the target band 130 is uniquely determined. In S203, the control circuit 30 moves the magnetic head 22 onto the track 11*b* as the first write target position.

Note that the order of execution of the process of S202 and the process of S203 is not limited thereto. The control circuit 30 may execute the process of S202 and the process of S203 in parallel. Furthermore, the start timing of the process of S203 may be earlier than the start timing of the process of S202.

Subsequently, when having received a new command (that is, a command subsequent to the change command) from the host 40 (S204), the control circuit 30 determines whether the new command is a write command instructing to write data in the target band 130 (S205).

When the new command is a write command instructing to write data to the target band 130 (S205: Yes), the control circuit 30 starts writing data to the magnetic disk 11 using the magnetic head 22 (S206).

The process of S203 allows the magnetic head 22 to be preliminarily moved to the track 11*b* as the first write target position. Therefore, in S206, the control circuit 30 can start writing without moving the magnetic head 22.

With completion of the writing (S207), a series of operations ends.

When the new command is not a write command instructing to write data to the target band 130 (S205: No), the control circuit 30 executes the new command (S208) to end the series of operations.

As described above, according to the embodiment, when having received the change command instructing to change the recording method of one band 130, the control circuit 30 changes the recording method of the target band 130 being a designated one band 130 in accordance with the change command, and moves the magnetic head 22 onto the target band 130 before receiving the next command.

Accordingly, in a case where the magnetic disk device 1 receives a write command for writing data to the target band 130 after the update command, it is possible to eliminate the necessity to move the magnetic head 22 in the radial direction according to the write command, or possible to suppress the distance of the movement. This makes it possible to quickly start writing data to the target band 130 using the magnetic head 22, leading to improvement of the writing performance.

Furthermore, according to the embodiment, when the received change command is a command instructing to change the recording method of the target band 130 to the SMR method, the control circuit 30 changes the recording method of the target band 130 to the SMR method and moves the magnetic head onto the track 11*b* as a first write position within the target band 130.

Therefore, when having received a write command instructing writing to the target band 130 following the change command, the control circuit 30 can start writing from the track 11*b* on which the magnetic head 22 is located at that time.

That is, the control circuit 30 can immediately start writing in response to the write command without moving the magnetic head 22 before starting writing. This achieves improvement of the writing performance.

Note that the control circuit 30 may move the magnetic head 22 onto the target band 130 even when changing the recording method of the target band 130 from CMR to SMR, similarly to when changing the recording method of the target band 130 from SMR to CMR.

Furthermore, according to the embodiment, in a case where the received change command is a command instructing to change the recording method of the target band 130 to the CMR method and the subsequently received command is a write command instructing to write to the target band 130, the control circuit 30 moves the magnetic head 22 onto the track 11*b* as a write position within the target band 130 and starts writing data.

Since the control circuit 30 preliminarily moves the magnetic head 22 onto the target band 130 before receiving the write command, it is possible to suppress the distance of movement of the magnetic head 22 according to the write command. This achieves improvement of the writing performance.

In the above description, the recording method is changed in the unit of band. The magnetic disk device 1 may be configured such that the recording method is changed in units of a plurality of bands.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk having a plurality of first storage regions disposed in a radial direction, each of the first storage regions including tracks, a recording method of each of the first storage regions being changeable between a first method and a second method, the first method being a method in which data of two tracks adjacent to each other in the radial direction of the magnetic disk are written so as to overlap each other, the second method being a method in which data of two tracks adjacent to each other in the radial direction of the magnetic disk are written so as not to overlap each other;

a magnetic head; and a control circuit that performs operations, when having received a first command instructing to change the recording method of one of the plurality of first storage regions, which is a second storage region, between the first method and the second method, the operations including changing the recording method of the second storage region in accordance with the first command, and moving the magnetic head onto the second storage region of which recording method has been changed in accordance with the first command, before receiving a second command, the second command being a command that is received first after the first command, wherein the magnetic disk device is connectable to a host, and the first command and the second command are commands received from the host.

2. The magnetic disk device according to claim 1, wherein, in the first method, an order of writing of data to the tracks in a third storage region is set so that writing starts from a first track among the tracks in the third storage region, the third storage region being a first storage region of which the recording method is the first method, and when the first command is a command instructing to change the recording method of the second storage region to the first method, the control circuit changes the recording method of the second storage region to the first method and moves the magnetic head onto the first track among the tracks in the second storage region before receiving the second command.

3. The magnetic disk device according to claim 2, wherein, when the control circuit has received the second command and the second command is a command instructing writing of data to the second storage region, the control circuit starts writing data starting from the first track.

4. The magnetic disk device according to claim 1, wherein, when the first command is a command instructing to change the recording method of the second storage region to the second method, the second command has been received, and the second command is a command instructing to write data to the second storage region, the control circuit moves the magnetic head onto a track as a write target position within the second storage region and starts writing data.

5. A method, being a method of controlling a magnetic disk device, the magnetic disk device being equipped with a magnetic disk and a magnetic head, the method comprising:

receiving a first command instructing to change a recording method of one of a plurality of first storage regions disposed in a radial direction of the magnetic disk between a first method and a second method, each of the first storage regions including tracks, the recording method of each of the first storage regions being changeable between the first method and the second method, the first method being a method in which data of two tracks adjacent to each other in the radial direction of the magnetic disk are written so as to overlap each other, the second method being a method in which data of two tracks adjacent to each other in the radial direction of the magnetic disk are written so as not to overlap each other;

changing a recording method of a second storage region in accordance with the first command, the second storage region being the one first storage region, and moving the magnetic head onto the second storage region of which recording method has been changed in accordance with the first command, before receiving a second command, the second command being a command that is received first after the first command, wherein the magnetic disk device is connected to a host, and the first command and the second command are commands received from the host.

6. The method according to claim 5, wherein, in the first method, an order of writing of data to the tracks in a third storage region is set so that writing starts from a first track among the tracks in the third storage region, the third storage region being a first storage region of which the recording method is the first method, and in a case where the first command is a command instructing to change the recording method of the second storage region to the first method, the moving includes operations of changing the recording method of the second storage region to the first method and moving the magnetic head onto the first track among the tracks in the second storage region before receiving the second command.

7. The method according to claim 6, further comprising:

receiving the second command; and starting writing data from the first track in a case where the second command is a command instructing writing of data to the second storage region.

8. The method according to claim 5, further comprising:

receiving the second command; and when the first command is a command instructing to change the recording method of the second storage region to the second method and the second command is a command instructing to write data to the second storage region, moving the magnetic head onto a track of a write destination in the second storage region and starting writing data.

9. The magnetic disk device according to claim 1, wherein the first command is a command that does not instruct writing of data to any storage region of the magnetic disk.

10. A magnetic disk device comprising:

a magnetic disk having a plurality of storage regions disposed in a radial direction, each of the storage regions including a plurality of tracks;

a magnetic head; and a control circuit configured to:

in response to receiving, from a host connected to the magnetic device, a write command designating one of the storage region as a target storage region, write data into the target storage region using one of a plurality of writing methods, which includes a first writing method in which data of two adjacent tracks in the radial direction are written so as to overlap each other and a second method in which data of two adjacent tracks in the radial direction are written so as not to overlap each other; and in response to receiving, from the host after the write command, a change command designating the target storage region, change a writing method of the target storage region from the one of the plurality of writing methods to another one of the plurality of writing methods and move the magnetic head onto the target storage region, without writing any data into any of the plurality of storage regions of the magnetic disk.

\* \* \* \* \*